Figure 1:
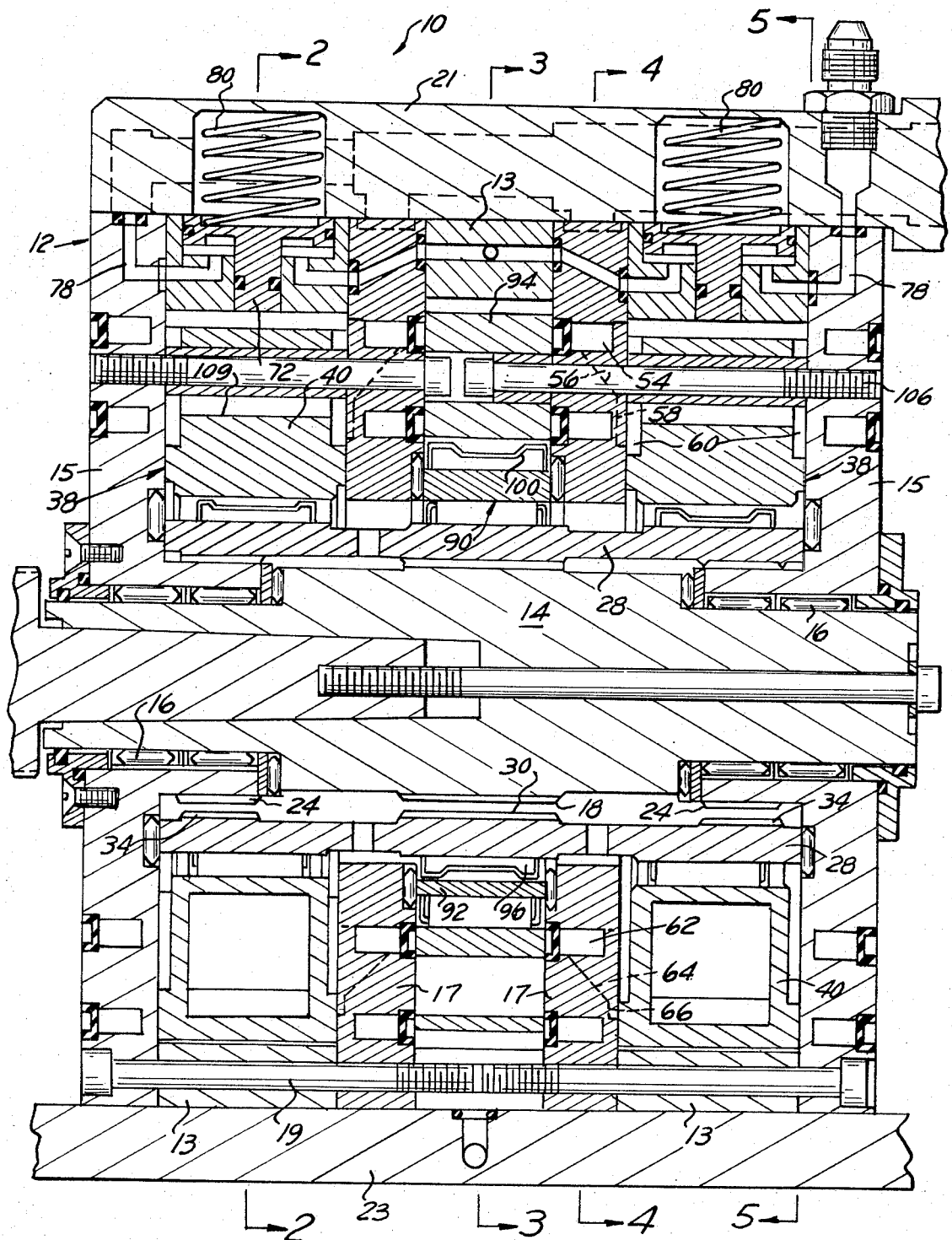

United States Patent
Verge et al.

[15] 3,700,362
[45] Oct. 24, 1972

[54] RING GEAR DRIVE WITH INTERNAL ROTARY CLUTCH

[72] Inventors: Kenneth W. Verge, Farmington; Robert D. Kachman, Madison Heights; Ronald G. Read, Birmingham, all of Mich.

[73] Assignee: The Bendix Corporation

[22] Filed: July 26, 1971

[21] Appl. No.: 166,145

[52] U.S. Cl. .................... 418/60, 418/61, 418/69, 192/71
[51] Int. Cl. ........ F01c 21/00, F03c 3/00, F04c 15/00
[58] Field of Search ..... 418/60, 61, 69; 192/71, 93 R; 74/804

[56] References Cited
UNITED STATES PATENTS

| | | | |
|---|---|---|---|
| 3,215,043 | 11/1965 | Huber | 418/61 |
| 3,516,765 | 6/1970 | Boyadjieff et al | 418/61 |
| 3,606,599 | 9/1971 | Verge et al | 418/61 |

*Primary Examiner*—William L. Freeh
*Assistant Examiner*—John J. Vrablik
*Attorney*—John R. Benefiel et al.

[57] ABSTRACT

An actuator of the type utilizing an orbiting ring gear to drive an output shaft in which a rotatable clutch is provided for coupling and decoupling the ring gear to the output shaft. A bearing supported crank ring cooperates with a supporting clutch ring to hold the ring gear in a confined path when coupling of the ring gear to the output shaft is desired, and the clutch ring is rotatable to a position in which the ring gear can be moved out of driving engagement with the output shaft when decoupling is desired. Fluid actuated motors, arranged symmetrically with respect to the clutch ring, are operable to move the ring gear so as to drive the output shaft and centering pistons cooperate with the motors to decouple the ring gear from the output shaft when the clutch ring is in a position releasing the ring gear for movement out of engagement with the output shaft.

18 Claims, 5 Drawing Figures

INVENTORS
KENNETH W. VERGE
ROBERT D. KACHMAN
RONALD G. READ

BY *Olsen and Stephenson*
ATTORNEYS

INVENTORS
KENNETH W. VERGE
ROBERT D. KACHMAN
RONALD G. READ

BY *Olsen and Stephenson*

ATTORNEYS

RING GEAR DRIVE WITH INTERNAL ROTARY CLUTCH

BACKGROUND OF THE INVENTION

This invention relates generally to actuators of the type shown in U.S. Pat. No. 3,516,765, owned by the assignee of this application, in which a ring gear that is eccentric with respect to stationary and output gears is moved in an orbital path so as to utilize the stationary gear as a ground and drive the output gear. When the ring gear is floatingly mounted, there is a tendency for the ring gear teeth to be forced out of meshing engagement with the teeth on the stationary and output gears because of the high gear tooth separation loads. The tooth separation problem is particularly severe at high torque levels. In addition, some installations of actuators of this type require selective coupling and decoupling of the ring gear to the output gear. An example of such an installation is when the actuator is used as an emergency flight control wherein the actuator is normally disengaged from the load shaft when the primary hydraulic flight control system is operative and the emergency flight control is to be engaged to the load shaft only in the event of primary hydraulic system failure. In such a case, a standby system which can be operated from a low pressure hot air supply such as compressor bleed air is desirable for significantly improving the survivability of damaged aircraft. In order to accomplish this standby objective, past systems have utilized auxiliary clutch elements with a resultant complexity, higher package size, and lower reliability. It is an object of the present invention, therefore, to provide an actuator capable of generating high output torques which overcomes the above-described tooth separation problems and which can be coupled and decoupled to the load shaft in response to a supply of low pressure air by means of an internal clutch assembly.

SUMMARY OF THE INVENTION

The actuator of this invention comprises a rotatably mounted output gear, a stationary gear concentric with the output gear and a ring gear which is movable between a coupled position in which it is drivingly engaged with the stationary and output gears and is eccentric relative thereto and a decoupled position in which it is in a clearance relation with the output gear and the stationary gear. A retainer assembly, consisting of a bearing mounted crank ring and a rotatable clutch ring, is mounted internally of the actuator housing between a pair of fluid actuated motors of the type shown in the aforementioned U.S. patent which are operable to orbit the ring gear so that it drives the output gear. The retainer assembly functions, when coupling of the ring gear to the output gear and the stationary gear is desired, to retain the ring gear in a predetermined orbital path in which orbital movement of the ring gear in response to actuation of the fluid motors is operable to drive the output gear. The retainer assembly is operable, when decoupling of the ring gear from the output gear is desired, to release the ring gear for movement out of its orbital path to a position in a clearance relation with the output gear which is thus drivable by a primary drive system without effecting any movement of the actuator. Coupling and decoupling of the ring gear to the output gear is accomplished by rotation of the clutch ring which is mounted inside the housing and, by virtue of its rotatable mounting, utilizes crank bearings so that operating friction under load is held to a minimum. Thus, the coupling and decoupling of the ring gear to the output gear in response to rotation of the clutch ring is advantageous from the standpoints of simplicity of the actuator and the effective service life of the actuator.

Further objects, features and advantages of this invention will become apparent from a consideration of the following description, the appended claims, and the accompanying drawing in which:

FIG. 1 is a fragmentary longitudinal sectional view of the actuator of this invention; and FIGS. 2, 3, 4 and 5 are reduced transverse sectional views of the actuator of this invention as seen from substantially the lines 2—2, 3—3, 4—4 and 5—5, respectively, in FIG. 1.

Figure 3:
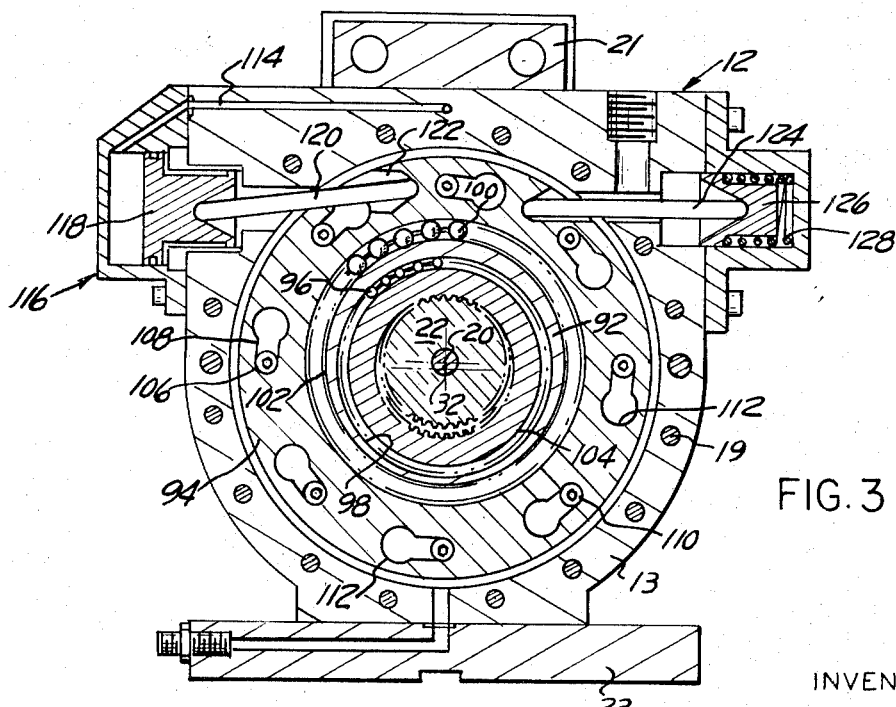
Figure 4:
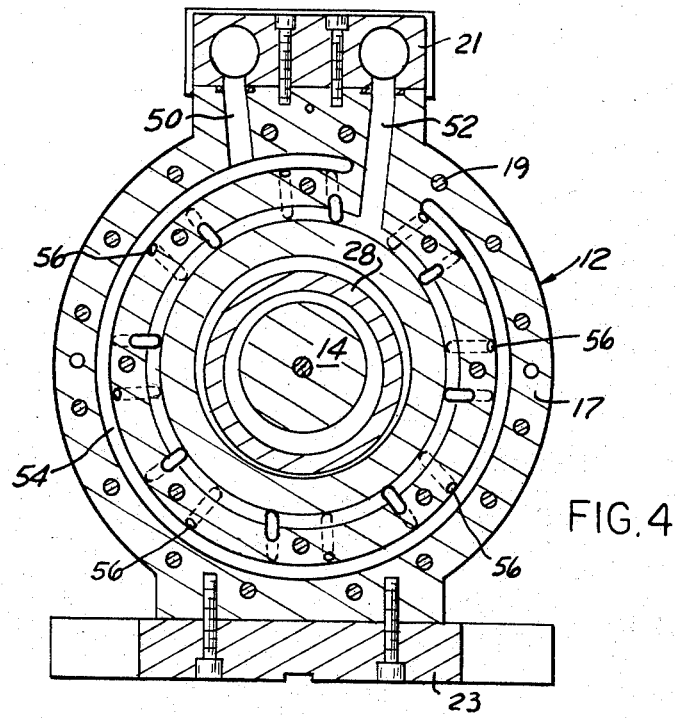

With reference to the drawing, the actuator of this invention, indicated generally at 10, is illustrated in FIG. 1 as including a housing 12 having annular outer wall sections 13, end walls 15, and a pair of annular internal partitions 17 secured together by bolts 19 extended therethrough. The housing 12 also includes a top plate 21 and a bottom plate 23. An output or load shaft 14 is rotatably mounted on bearings 16 carried by the housing end walls 15. The output shaft 14 is provided intermediate its ends with radially outwardly projecting teeth 18 disposed on a pitch circle of predetermined diameter and having an axis 20 (FIG. 3). The portion of the shaft 14 which is provided with the teeth 18 constitutes what is hereinafter referred to as an output gear 22.

The housing 12 is provided with two axially spaced identical sets of gear teeth 24 which are likewise arranged on a pitch circle of predetermined diameter and having an axis coincident with the axis 20. Each portion of the housing 12 that is formed with the teeth 24 constitutes what is hereinafter referred to as a stationary gear 26. A tubular ring gear 28 is positioned within the housing 12 and is provided with a first set of gear teeth 30 which are directed radially inwardly and are drivingly engageable with the output gear teeth 18. The teeth 30 are disposed on a pitch circle of a diameter different than the pitch circle on which the output gear teeth 18 are disposed having an axis 32 which is eccentric with respect to the axis 20 when the ring gear 28 is drivingly coupled to the output gear 22 as shown in FIG. 3. Similarly, the ring gear 28 has two sets of teeth 34 which are engageable with the stationary gear teeth 24 and are disposed on a pitch circle of a diameter different than the pitch circle for the teeth 24 and having the axis 32.

The gears 22, 26 and 28 are enclosed within the housing 12 and the actuator 10 is driven by a pair of fluid motors 38 disposed within the housing and spaced apart in a direction axially of the ring gear 28. Since the motors 38 are identical, only one will be described in detail herein, with like numerals indicating like parts on the motors. Each motor 38 includes a rotor 40 (FIG. 2) which is mounted on a housing wall section 13 by means of a plurality of radially extending dog bone vanes 41, illustrated as being eight in number, which cooperate with the rotor 40 and the housing section 13 to form a series of fluid displacement chambers 42 extending about the rotor 40. Each of the vanes 41 is pivotally mounted in the housing section 13 and is pivotally and slidably mounted in a slot 44 in the rotor 40. The rotor 40 is of an annular shape, having a circular internal surface 46 which supports a bearing 48 that in turn supports the ring gear 28. When fluid under pressure is supplied to successive ones of the fluid displacement chambers 42, as explained in detail in the aforementioned U.S. patent, the rotor 40 is caused to orbit in an epicyclic path so as to in turn orbit the ring gear 28 and cause the ring gear 28 to drive the output gear 22.

A pair of fluid inlet and exhaust passages 50 and 52 (FIG. 4) are formed in the housing 12. The passage 50 can function as an inlet passage connected to a supply of fluid under pressure such as the output side of a pump or the like (not shown) and the passage 52 can function as an exhaust passage. The passage 50 communicates with an annular passage 54 in a partition 17 which in turn communicates via passages 56 with pressure ports 58 formed in the partition 17. The ports 58 are selectively connectable to the fluid displacement chambers 42 through notches 60 in the rotor 40. Similarly, the exhaust passage 52 communicates with an annular passage 62 in a partition 17 which communicates, via conduits 64, with exhaust ports 66 in the partition 17. The ports 66 are in turn selectively communicatable with the fluid displacement chambers 42 through the notches 60 in the rotor 40. When the passage 50 functions as the inlet passage, and the passage 52 functions as the exhaust passage, rotation of the shaft 14 in one direction will be accomplished. Alternatively, the passage 50 can function as the exhaust and passage 52 can function as the inlet, in which case rotation of the shaft 14 in the opposite direction will be accomplished.

Figure 5:
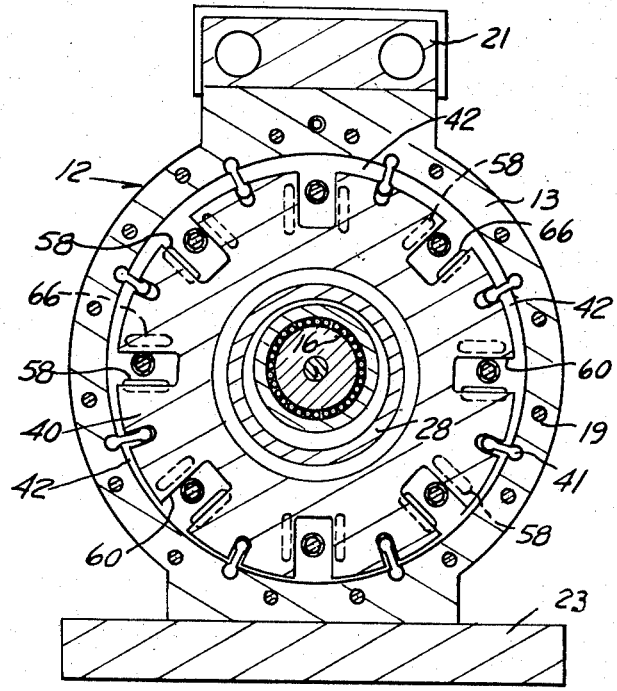

As shown in FIG. 5, in the illustrated position of the rotor 40, the two chambers 42 at the top and bottom of the rotor 40 communicate with neither the pressure ports 58 nor the exhaust ports 66, the three displacement chambers 42 on the left hand side of the rotor 40 communicate with the pressure ports 58 and the three displacement chambers 42 on the right hand side of the rotor 40 communicate with the exhaust ports 66. The result is a horizontally directed resultant force on the rotor 40 which is transmitted to the ring gear 28. The resulting movement of the rotor 40 provides for a successive communication of the displacement chambers 42 with the pressure ports 58 and the exhaust ports 66 so as to accomplish an orbiting movement of the rotor 40 about the output gear axis 20 with a resultant orbiting movement of the ring gear 28 in which the ring gear axis 32 is orbited about the axis 20 and the ring gear 28 is rotated about the stationary gears 26 so as to drive the output gear 22.

For a purpose to appear presently, three equally spaced centering pistons 72 (FIG. 2) are provided for each rotor 40. Each centering piston 72 is slidably supported in a cavity 74 in a housing section 13 which cooperates with the piston to form a cylinder chamber 76. The housing 12 includes fluid supply passages 78 connected to the fluid chambers 76, so that when fluid is supplied through the passages 78 to the chambers 76, the pistons 72 are retracted to the positions shown in FIG. 2. A spring 80, associated with each piston 72, urges the pistons 72 radially inwardly of the housing 12 so that when the supply of fluid to the chambers 76 is discontinued, the springs 80 will urge the pistons 72 inwardly into engagement with the rotors 40. The springs 80 exert forces on the pistons 72 of sufficient magnitude to move the pistons 72 inwardly to stop positions against the bottom walls 82 of the cavities 76. Thus, when the supply of fluid to the cavities 76 is discontinued, the pistons 72 for each rotor 40 project inwardly of the housing 12 equal distances so as to center the rotor 40 in the housing 12. In their centered positions, the rotors 40 locate the ring gear 28 in a position in which the teeth 30 and 34 thereon are in a clearance relation with the teeth 18 and 26.

A retainer assembly 90 (FIG. 1) is positioned in the center housing section 13 at a position between the partitions 17. As shown in FIGS. 1 and 3, the retainer assembly 90 consists of a crank ring 92, a clutch ring 94, a first bearing 96 disposed between the ring gear 28 and the inner surface 98 of the crank ring 92 and a second bearing 100 disposed between the crank ring outer surface 102 and the clutch ring 94. The inner surface 98 of the crank ring 92 is concentric with the outer surface 104 of the ring gear 28 and is thus disposed on a diameter extending through the axis 32. On the other hand, the outer surface 102 of the crank ring 92 is concentric with respect to the pitch circle on which the output gear teeth 18 are disposed having the axis 20.

Figure 2:
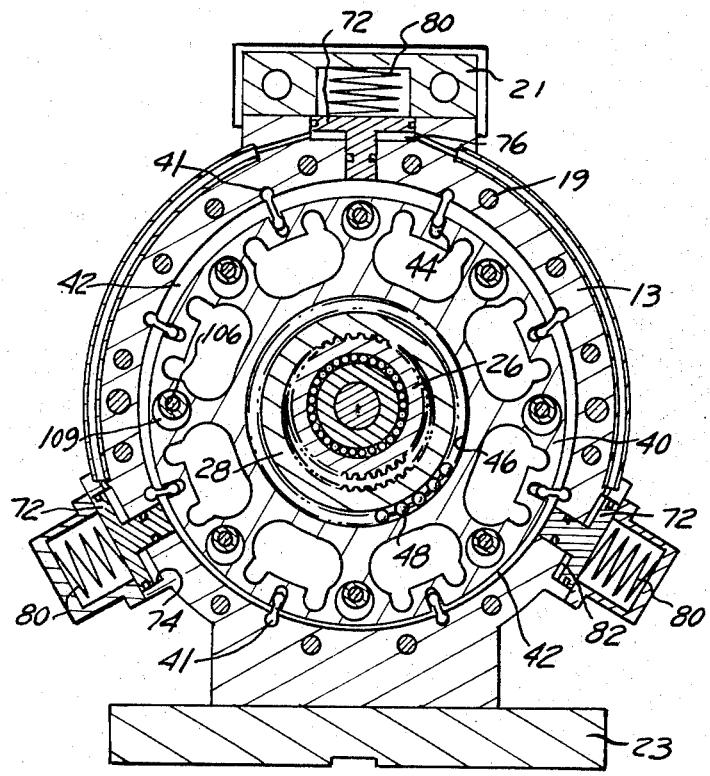

The clutch ring 94 is movable between the fixed position shown in FIG. 3 and a floating position in which the clutch ring 94 is free to move transversely of the axis 20. A plurality of tie rods 106 are mounted on the housing 12 so that they are parallel to the axis 20 and extend through irregularly shaped arcuate slots 108 in the clutch ring 94. As shown in FIGS. 1 and 2, the rods 106 extend through enlarged openings 109 in the rotors 40 so that the rods will not interfere with orbiting movement of the rotors 40. Each slot 108 has a smaller end 110 which is of substantially the same diameter as the diameter of a tie rod 106, as shown in FIG. 3. The opposite end 112 of the slot 108 is enlarged. As a result, when the clutch ring 94 is rotated to the position shown in FIG. 3 in which the tie rods 106 are in the smaller ends 110 of the slots 108, the clutch ring 94 is held in the fixed position shown in FIG. 3. The clutch ring 94 is movable to this fixed position when fluid under pressure is supplied through a passage 114 in the housing 12 to a piston and cylinder assembly 116 so as to extend the piston 118 therein to the position shown in FIG. 3. This extension movement of the piston 118 moves a tie rod 120, which is pivotally mounted on the piston and pivotally engaged in a slot 122 in the clutch ring 94, so as to exert a clockwise force on the clutch ring 94 to move it to a position in which the tie rods 106 are disposed in the small ends 110 of the slots 108. When a supply of fluid under pressure to the cylinder assembly 116 is discontinued, the clutch ring 94 is rotated in an opposite direction by a pivoted connecting rod 124 urged by a spring pressed piston 126 mounted in a cylinder cavity 128 formed in the housing 12. Movement of the clutch ring 94 in a counterclockwise direction positions the tie rods 106 in the larger ends 112 of the slots 108 thereby enabling floating movement of the clutch ring 94 in the housing 12.

In the operation of the actuator 10, assume a supply of fluid under pressure to the cylinder 116 so that the clutch ring 94 is in its confined position shown in FIG. 3 and that fluid under pressure is being supplied to each of the fluid motors 38 through the passage 50 so that the fluid motors 38 are operating to orbit the ring gear 28 so as to drive the output shaft 14. The clutch ring 94, through the bearing 100, maintains the crank ring 92 in a position in which the inner surface 98 thereof defines the orbital path through which the ring gear 28 must travel. The crank ring 92 thus precludes disengagement of the ring gear teeth 30 and 34 from the output gear teeth 18 and the stationary gear teeth 24 so that high torques can be developed on the shaft 14 by the actuator 10 without the risk of the ring gear teeth being disengaged by the tooth separation forces. During operation of the actuator 10, fluid under pressure is also supplied through the passage 78 to the cavities 76 so as to maintain the centering pistons 72 in retracted positions.

Now assume that it is desired to decouple the actuator 10 from the load shaft 14 so that the load shaft 14 can rotate freely on the bearings 16. The supply of fluid under pressure to the motors 38 is discontinued and the supply of fluid under pressure to the cylinder assembly 116 is also discontinued. The spring pressed plunger 126 then moves the tie rod 124 so as to rotate the clutch ring 94 to the above described position in which it can float transversely of the axis 20 on the tie rods 106. Concurrently, the supply of fluid under pressure to the piston chambers 76 is discontinued and the springs 80 operate to project the pistons 72 radially inwardly so as to center the rotors 40. Centering of the rotors 40 moves the ring gear 28 to a position in a clearance relation with the output gear teeth 18 and the stationary gear teeth 24, with the crank ring 92 and the clutch ring 94 floating to accommodate this movement. The load shaft 14 is then free to rotate in the housing 12 without engaging the ring gear 28. When it is desired to couple the ring gear 28 to the output gear 22 and the stationary gears 26, the supply of fluid under pressure to the drive motors 40 and the cylinder assembly 116 is commenced and the supply of fluid under pressure to the piston cavities 76 is reinstituted so as to retract the centering pistons 72.

We claim:

1. In an actuator which includes rotatably mounted output gear means having an axis, stationary gear means arranged in a concentric relation with said output gear means, a ring gear member drivingly engaged with said stationary and output gear means, said ring gear member having an axis arranged eccentric with respect to the axis of said output gear means, means providing a moving force on said ring gear member in a direction substantially perpendicular to said axis of the output gear means and moving in one direction about said axis to cause said ring gear member to move in an orbital path in which the axis thereof is orbited about said output gear means axis, the improvement comprising a retainer assembly engaged with said ring gear member and operable to confine movement thereof to movement along said path to thereby preclude disengagement of said ring gear member from said stationary and output gear means, said retainer assembly having at least a portion thereof rotatably mounted for movement to a position in which said ring gear member is unconfined and thus disengageable from said stationary and output gear means.

2. An actuator according to claim 1 further including a housing and wherein said retainer means comprises a crank ring and a clutch ring, said crank ring having an inner surface forming a path defining surface which is substantially circular and eccentric with respect to said output gear means axis and an outer surface eccentric with respect to said inner surface and rotatably supported in said clutch ring, said clutch ring being mounted in said housing for limited rotational movement, and bearings interposed between said crank ring inner surface and said ring gear and between said crank ring outer surface and said clutch ring.

3. An actuator according to claim 1 wherein said retainer assembly includes a member having a path defining surface which is substantially circular and is eccentric with respect to said output gear means axis.

4. An actuator according to claim 3 further including means engaged with said retainer assembly operable to rotate at least a portion thereof.

5. An actuator according to claim 1 wherein said retainer assembly includes a circular path defining surface supporting said ring gear and a support for said surface, means mounting said support for rotatable movement between a first position in which said surface is held in a fixed position holding said ring gear member in driving engagement with said output and stationary gear means and a second position in which said surface is movable to a position allowing said ring gear member to move to a position in a clearance relation with said output and stationary gear means.

6. An actuator according to claim 5 further including a housing, and wherein said support is rotatably mounted in said housing for movement between said first and second positions.

7. An actuator according to claim 6 further including means mounted on said housing and engaged with said support operable to rotate said support between said first and second positions.

8. An actuator comprising a rotatably mounted output member having gear teeth thereon disposed on a pitch circle of predetermined diameter and having a first axis, a stationary member having gear teeth thereon disposed on a pitch circle of predetermined diameter and an axis coincident with said first axis, a ring gear having first teeth disposed on a pitch circle of a diameter different from the diameter of the stationary gear pitch circle, at least one of said ring gear teeth being drivingly engaged with at least one of said stationary gear teeth, said ring gear having second teeth disposed on a pitch circle of a diameter different from the diameter of said output gear pitch circle, at least one of said second teeth being drivingly engaged with at least one of said output gear teeth, said ring gear having an axis arranged eccentric with respect to said first axis, motor means operable to move said ring gear so that the axis thereof orbits about said first axis, a retainer assembly rotatably supporting said ring gear in a position in which said axis thereof is eccentric with respect to said first axis so as to maintain said driving engagement of said ring gear with said output and stationary gear teeth, and means operable to rotate said retainer assembly and move said ring gear to a position in which the teeth thereon are in a clearance relation with said output and stationary gear teeth.

9. An actuator according to claim 8 wherein said retainer assembly includes a crank ring having an inner surface arranged in a supporting concentric relation with said ring gear axis and an outer surface concentric with respect to said output member axis, and a clutch member arranged in a supporting relation with said crank ring.

10. An actuator according to claim 9 further including a housing, a plurality of supporting rods in said housing extending through said clutch member in a substantially parallel relation with said output member axis, means forming irregularly shaped arcuate slots in said clutch member through which said rods extend, each of said slots having a small end corresponding substantially in size to the size of said rods and a larger end, said crank member being rotatable in one direction to a position to locate said rods in the small ends of said slots so that said rods confine said clutch member to a position in which said ring gear is maintained in driving engagement with said output and stationary gear members, said clutch member being rotatable in an opposite direction to a position in which said rods are located in the larger ends of said slots to thereby enable movement of said clutch member in a direction transversely of said output gear axis to in turn enable movement of said ring gear teeth into position in a clearance relation with said output and stationary gear teeth.

11. An actuator according to claim 10 further including fluid actuated piston and cylinder means on said housing engaged with said clutch member and operable to rotate said clutch member in said one direction.

12. An actuator according to claim 11 further including spring actuated means mounted on said housing and engaged with said clutch member for rotating said clutch member in said opposite direction.

13. An actuator according to claim 10 further including force generating means mounted on said housing and operable to apply forces to said ring gear effective to move said ring gear transversely of said output gear axis to a position in which said ring gear teeth are moved into clearance relation with said output and stationary gear teeth.

14. An actuator according to claim 13 wherein said force generating means comprises a plurality of piston and cylinder assemblies.

15. An actuator according to claim 8 further including a housing extending about said ring gear and said retainer assembly and wherein said motor means comprises a pair of fluid motors disposed in said housing in positions spaced axially of said ring gear on opposite sides of said retainer assembly.

16. An actuator according to claim 15 wherein each of said motors includes a rotor mounted in said housing for orbital movement at a position extending about said ring gear so that orbital movement of said rotor is transmitted to said ring gear, and means in said housing forming a plurality of fluid displacement chambers arranged so that forces developed therein are transmitted to said rotor to effect said orbital movement.

17. An actuator according to claim 16 wherein said means for moving said ring gear to said position in which the teeth thereon are in a clearance relation with said stationary and output gear teeth comprises a plurality of circumferentially spaced pistons mounted on said housing for movement inwardly thereof into engagement with each of said rotors for moving said rotors transversely of said ring gear axis, and means for moving said pistons inwardly of said housing.

18. An actuator according to claim 17 wherein said means for moving said pistons comprises compression springs urging said pistons inwardly, and fluid pressure means operable selectively to retract said pistons out of engagement with said rotors against the urging of said springs.

* * * * *